(12) United States Patent
Park et al.

(10) Patent No.: US 11,714,301 B2
(45) Date of Patent: Aug. 1, 2023

(54) LIGHT MODULATOR, OPTICAL DEVICE INCLUDING LIGHT MODULATOR, AND ELECTRONIC APPARATUS INCLUDING OPTICAL DEVICE

(71) Applicant: SAMSUNG ELECTRONICS CO., LTD., Suwon-si (KR)

(72) Inventors: Junghyun Park, Seoul (KR); Yeonsang Park, Seoul (KR); Sunil Kim, Osan-si (KR); Duhyun Lee, Yongin-si (KR); Byunggil Jeong, Anyang-si (KR)

(73) Assignee: SAMSUNG ELEOTRONICC CO., LTD., Suwon-si (KR)

( * ) Notice: Subject to any disclaimer, the term of this patent is extended or adjusted under 35 U.S.C. 154(b) by 507 days.

(21) Appl. No.: 16/880,350

(22) Filed: May 21, 2020

(65) Prior Publication Data
US 2021/0173239 A1    Jun. 10, 2021

(30) Foreign Application Priority Data
Dec. 10, 2019  (KR) .................. 10-2019-0164156

(51) Int. Cl.
*G02F 1/03* (2006.01)
*G02F 1/01* (2006.01)
(Continued)

(52) U.S. Cl.
CPC ............ *G02F 1/0311* (2013.01); *G02B 26/10* (2013.01); *G02F 1/0147* (2013.01);
(Continued)

(58) Field of Classification Search
CPC .. G02F 1/0147; G02F 26/10; G02F 2201/346; G02F 2201/307; G02F 1/0316; G02F 1/09; G02F 1/0311
See application file for complete search history.

(56) References Cited

U.S. PATENT DOCUMENTS

| | | | |
|---|---|---|---|
| 10,734,554 B2 | 8/2020 | Heo et al. | |
| 2002/0186438 A1* | 12/2002 | Morozov | ........... H04B 10/2519 398/158 |

(Continued)

FOREIGN PATENT DOCUMENTS

| | | |
|---|---|---|
| JP | 2003-270432 A | 9/2003 |
| KR | 10-2018-0002212 A | 1/2018 |
| KR | 10-2019-0022326 A | 3/2019 |

*Primary Examiner* — Christopher Stanford
*Assistant Examiner* — Journey F Sumlar
(74) *Attorney, Agent, or Firm* — Sughrue Mion, PLLC

(57) ABSTRACT

Provided is a light modulator including a substrate, and a resonator configured to modulate a phase of incident light by modulating a refractive index based on an external stimulus, the resonator comprising a first reflective structure provided on the substrate, a cavity layer provided on the first reflective structure, and a second reflective structure provided on the cavity layer, wherein at least one of the first reflective structure or the second reflective structure comprises first material layers, second material layers that are alternately stacked with the first material layers, and a third material layer, and wherein each of the first material layers has a first refractive index, each of the second material layers has a second refractive index that is different from the first refractive index, and the third material layer has a third refractive index that is different from the first refractive index.

12 Claims, 12 Drawing Sheets

(51) Int. Cl.
*G02B 26/10* (2006.01)
*G02F 1/09* (2006.01)
(52) U.S. Cl.
CPC .............. *G02F 1/0316* (2013.01); *G02F 1/09* (2013.01); *G02F 2201/307* (2013.01); *G02F 2201/346* (2013.01)

(56) References Cited

U.S. PATENT DOCUMENTS

| | | | |
|---|---|---|---|
| 2003/0081319 A1* | 5/2003 | Hsu | G02B 5/288 359/579 |
| 2005/0063451 A1 | 3/2005 | Abe et al. | |
| 2008/0291541 A1* | 11/2008 | Padiyath | G02B 5/0231 359/569 |
| 2008/0292820 A1* | 11/2008 | Padiyath | G02B 5/208 428/34 |
| 2009/0231665 A1* | 9/2009 | Takei | G02B 6/2746 156/60 |
| 2011/0181936 A1* | 7/2011 | Cho | G02F 1/017 977/932 |
| 2015/0069434 A1 | 3/2015 | Lin | |
| 2016/0109628 A1* | 4/2016 | Weber | G02B 27/141 359/359 |
| 2018/0046056 A1* | 2/2018 | Na | G02F 1/21 |
| 2020/0183148 A1 | 6/2020 | Park et al. | |

* cited by examiner

LIGHT MODULATOR, OPTICAL DEVICE INCLUDING LIGHT MODULATOR, AND ELECTRONIC APPARATUS INCLUDING OPTICAL DEVICE

CROSS-REFERENCE TO RELATED APPLICATION

This application claims priority to Korean Patent Application No. 10-2019-0164156, filed on Dec. 10, 2019, in the Korean Intellectual Property Office, the disclosure of which is incorporated herein in its entirety by reference.

BACKGROUND

1. Field

Example embodiments of the present disclosure relate to a light modulator, an optical device including the light modulator, and an electronic apparatus including the optical device.

2. Description of Related Art

Light modulators that change transmittance/reflectivity, polarization, phase, intensity, path, etc. of incident light are used in various types of optical devices. In addition, light modulators of various structures have been introduced to control the above-described properties of incident light in an optical device in a desired manner.

For example, liquid crystals having optical anisotropy, a microelectromechanical system (MEMS) structure using micromechanical movement of a light blocking/reflecting element, and the like have been widely used as general light modulators. Such optical modulators have an operational response time of several µs or more according to characteristics of a driving method thereof.

Recently, attempts have been made to apply a metasurface to a light modulator. The metasurface refers to a structure having a thickness, a pattern, a cycle, or the like with a value smaller than a wavelength of incident light. For example, an optical device using a tunable metasurface, which has variable optical properties (e.g., a refractive index) and is based on a semiconductor material with a multi-quantum well structure, has been used in various technical fields ranging from optical communications to optical sensing. For example, the light modulator using a tunable metasurface includes a pair of distributed Bragg reflectors (DBRs) or a Fabry-Perot resonator structure having a sandwich structure in which a semiconductor material is provided between one DBR and a grating reflector or between one DBR and a metal mirror.

SUMMARY

One or more example embodiments provide a light modulator including a reflective multilayer structure having precisely adjusted reflectivity or transmittance, an optical device including the light modulator, and an electronic apparatus including the optical device.

Aspects are not limited thereto and there may be additional aspects.

Additional aspects will be set forth in part in the description which follows and, in part, will be apparent from the description, or may be learned by practice of the example embodiments of the disclosure.

According to an aspect of an example embodiment, there is provided a light modulator including a substrate, and a resonator configured to modulate a phase of incident light by modulating a refractive index based on an external stimulus, the resonator comprising a first reflective structure provided on the substrate, a cavity layer provided on the first reflective structure, and a second reflective structure provided on the cavity layer, wherein at least one of the first reflective structure or the second reflective structure comprises first material layers, second material layers that are alternately stacked with the first material layers, and a third material layer, and wherein each of the first material layers has a first refractive index, each of the second material layers has a second refractive index that is different from the first refractive index, and the third material layer has a third refractive index that is different from the first refractive index.

A first optical thickness of each of the first material layers may be equal, and a third optical thickness of the third material layer may be different from the first optical thickness of each of the first material layers.

A first physical thickness of each of the first material layers may be equal, and a third physical thickness of the third material layer may be equal to the first physical thickness of the first material layers.

The first physical thicknesses of the first material layers and the third physical thickness of the third material layer may be odd-number multiples of $\lambda/(4*n_1)$, where $\lambda$ is a wavelength of the incident light and $n_1$ is the first refractive index of the first material layers.

A second physical thickness of the second material layers may be an odd-number multiple of $\lambda/(4*n_2)$, where $\lambda$ is a wavelength of the incident light and $n_2$ is the second refractive index of the second material layers.

A first reflectivity of the first reflective structure may be greater than a second reflectivity of the second reflective structure.

At least one of the first reflective structure and the second reflective structure may include a distributed Bragg reflector or a grating reflector.

The light modulator may further include a heating element provided between the substrate and the second reflective structure, provided between the first reflective structure and the second reflective structure, or provided above the second reflective structure, and the first reflective structure or the second reflective structure may include a material, a refractive index of the material changing based on temperature.

The cavity layer, the first reflective structure, or the second reflective structure may include an electro-optic material, a permittivity of the electro-optic material changing based on an electrical signal supplied thereto, and a voltage is applied through a first electrode in contact with the first reflective structure and a second electrode in contact with the second reflective structure.

The external stimulus may include at least one of heat, voltage, current, or a magnetic field.

According to another aspect of an example embodiments, there is provided a light modulator including a substrate, and a resonator configured to modulate a phase of incident light by modulating a refractive index based on an external stimulus, the resonator including a first reflective structure provided on the substrate, a cavity layer provided on the first reflective structure, and a second reflective structure provided on the cavity layer, wherein at least one of the first reflective structure or the second reflective structure includes repeatedly and alternately stacked first material layers and second material layers, wherein each of the first material layers have a first refractive index and each of the second material layers have a second refractive index, and wherein a thickness t1' of at least one of the first material layers is different from a thickness t1 of other of the first material layers.

The thickness t1 of the other of the first material layers may be an odd-number multiple of $\lambda/(4*n_1)$, and wherein the thickness t1' of the at least one first material layer satisfies $t1-0.75*\lambda/(4*n_1) \leq t1' < t1$ or $t1 < t1' \leq 2*t1$, where $\lambda$ is a wavelength of incident light and $n_1$ is the first refractive index of the first material layers.

A thickness of the second material layers may be an odd-number multiple of $\lambda/(4*n_2)$, where $\lambda$ is a wavelength of incident light and $n_2$ is the second refractive index of the second material layers.

A first reflectivity of the first reflective structure may be greater than a second reflectivity of the second reflective structure.

The other of the first reflective structure and the second reflective structure may include a distributed Bragg reflector or a grating reflector.

The external stimulus may include at least one of heat, voltage, current, or a magnetic field.

According to yet another aspect of an example embodiment, there is provided an optical device including a spatial light modulator including a plurality of light modulators, each of the plurality of light modulators including a substrate, and a resonator configured to modulate a phase of incident light by modulating a refractive index based on an external stimulus, the resonator comprising a first reflective structure provided on the substrate, a cavity layer provided on the first reflective structure, and a second reflective structure provided on the cavity layer, wherein at least one of the first reflective structure or the second reflective structure comprises first material layers, second material layers that are alternately stacked with the first material layers, and a third material layer, and wherein each of the first material layers has a first refractive index, each of the second material layers has a second refractive index that is different from the first refractive index, and the third material layer has a third refractive index that is different from the first refractive index, and wherein each of the plurality of light modulators are provided corresponding to one-dimensional pixels or two-dimensional pixels, the spatial light modulator being configured to modulate a phase of light for each of the pixels.

The optical device may further include a phase mask including a transparent support plate and a plurality of nanostructures provided on the transparent support plate, wherein each of the plurality of nanostructures are provided differently for each of the corresponding pixels to control a phase of light.

According to another aspect of an example embodiment, there is provided an electronic apparatus including a light source, an optical device configured to adjust a traveling direction of light emitted from the light source and transmit the light to travel toward a subject, the optical device including a spatial light modulator including a plurality of light modulators, each of the plurality of light modulators including a substrate, and a resonator configured to modulate a phase of incident light by modulating a refractive index based on an external stimulus, the resonator comprising a first reflective structure provided on the substrate, a cavity layer provided on the first reflective structure, and a second reflective structure provided on the cavity layer, wherein at least one of the first reflective structure or the second reflective structure comprises first material layers, second material layers that are alternately stacked with the first material layers, and a third material layer, and wherein each of the first material layers has a first refractive index, each of the second material layers has a second refractive index that is different from the first refractive index, and the third material layer has a third refractive index that is different from the first refractive index, and a phase mask including a transparent support plate and a plurality of nanostructures provided on the transparent support plate, wherein each of the plurality of light modulators are provided corresponding to one-dimensional pixels or two-dimensional pixels, the spatial light modulator being configured to modulate a phase of light for each of the pixels, and wherein each of the plurality of nanostructures are provided differently for each of the corresponding pixels to control the phase of light, a receiver configured to receive the light reflected from the subject and convert the light into an electrical signal, and a processor configured to process the electrical signal obtained by the receiver.

The electronic apparatus may include at least one of a light detection and ranging (LiDAR) apparatus, a three-dimensional (3D) image obtaining apparatus, a 3D sensor, a depth sensor, or a holographic display apparatus.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
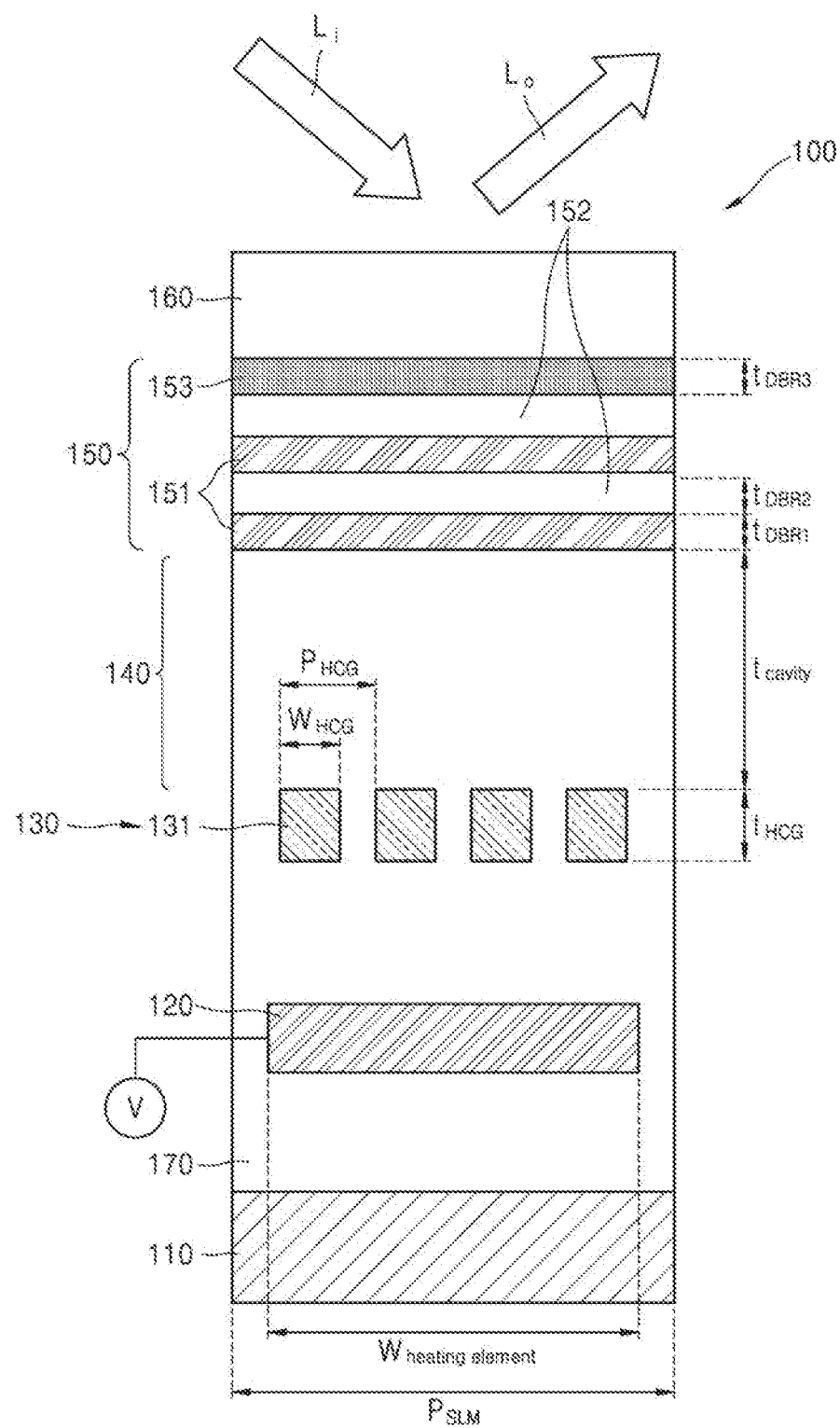
FIG. 1 is a side cross-sectional view illustrating a structure of a light modulator according to an example embodiment.

Reference will now be made in detail to example embodiments which are illustrated in the accompanying drawings. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the drawings, the same reference numerals may represent the same elements, and a size of each element may be exaggerated for clarity and convenience of description. Example embodiments described below are merely examples and various modifications may be made therein.

Terms such as "first" and "second" may be used to describe various components but the components should not be limited by the terms. These terms are only used to distinguish one component from another. A light modulator, an optical device including the optical device, and an electronic apparatus including the optical device may be embodied in many different forms and are not limited to example embodiments set forth herein.

As used herein, the singular expressions are intended to include plural forms as well, unless the context clearly dictates otherwise. It will be understood that when an element is referred to as "including" another element, the element may further include other elements unless mentioned otherwise. It will be further understood that when one element is referred to as being "on" or "above" another element, the element may be on, below, or on a left or right side of the other element, in direct contact with or without contacting the other element.

Terms such as "unit", "module," and the like, when used herein, represent units for processing at least one function or operation, which may be implemented by hardware, software, or a combination of hardware and software.

FIG. 1 is a side cross-sectional view illustrating a structure of a light modulator 100 according to an example embodiment.

Referring to FIG. 1, the light modulator 100 according to the example embodiment is a reflective device in which incident light Li is incident on and output light Lo is output from the same plane which may be the upper surface of the light modulator 100. The light modulator 100 includes a substrate 110, a heating element 120 provided on the substrate 110, a first reflective structure 130 provided on the heating element 120, a cavity layer 140 provided on the first reflective structure, and a second reflective structure 150 provided on the cavity layer 140. An upper layer 160 formed of a transparent material may be provided on the second reflective structure 150.

The substrate 110 may include a metal. For example, the metal included in the substrate 110 may include gold (Au), aluminum (Al), or silver (Ag), but is not limited thereto. The substrate 110 including the metal may serve as a reflective layer which reflects light passing through a resonator. Accordingly, reflectivity of the light modulator 100 with respect to the incident light Li may be higher than that when the substrate 110 does not include the metal. However, embodiments are not limited thereto, and the substrate 110 may not include a metal. An area of the substrate 110 may be larger than an area of the resonator. For example, a width $P_{SLM}$ of the substrate 110 may be larger than a width $W_{heating\ element}$ of the heating element 120 inducing a change in refractive index in the resonator.

The heating element 120 may include a metal wire, and heating temperature may vary according to the intensity of current supplied to the metal wire.

The first reflective structure 130, the cavity layer 140, and the second reflective structure 150 form a Fabry-Perot resonator together. In this case, the reflectivity of the second reflective structure 150 may be designed to be lower than the reflectivity of the first reflective structure 130 such that light resonating between the first reflective structure 130 and the second reflective structure 150 may be output to the outside of light modulator 100 via the second reflective structure 150.

A total optical thickness $L_C$ which is a value obtained by multiplying a physical thickness thereof by the refractive index of a material layer of the cavity layer 140 may be set by the following Equation 1 for resonance between the first reflective structure 130 and the second reflective structure 150.

$$2\pi/\lambda \times 2L_C + \varphi_1 + \varphi_2 = 2\pi m \qquad \text{[Equation 1]}$$

Here, $\varphi_1$ is a reflection phase experienced by light waves incident on the first reflective structure 130 from the cavity layer 140, $\varphi_2$ is a reflection phase experienced by light waves incident on the second reflective structure 150 from the cavity layer, and m is an integer representing the order of resonance.

The first reflective structure 130 is a grating reflector. In the grating reflector, gratings 131 may be arranged spaced apart from each other at certain intervals. The reflectivity and transmissivity of light may be controlled by adjusting, for example, the interval $P_{HCG}$ between the gratings 131 and a height $t_{HCG}$, width $W_{HCG}$ of the gratings 131. of the gratings 131. The gratings 131 may have a refractive index greater than a refractive index of a peripheral material 170. For example, the gratings 131 may be formed of Si.

The second reflective structure 150 is a multilayer reflector in which first material layers 151 and second material layers 152 having different refractive indices are repeatedly and alternately stacked, and at least one of locations at which the first material layers 151 are to be provided is replaced with a third material layer 153. The third material layer 153 has a refractive index different from the refractive indices of the first material layers 151 and the second material layers 152. For example, the first material layer 151 may be formed of Si, the second material layer 152 may be formed of silicon oxide ($SiO_2$), and the third material layer 153 may be formed of tin oxide ($TiO_2$). The refractive index $n_{Si}$ of Si is approximately 3.5, the refractive index $n_{TiO2}$ of $TiO_2$ is approximately 2.0, and the refractive index $n_{SiO2}$ of $SiO_2$ is approximately 1.5.

All the first material layers 151 have the same optical thickness, and an optical thickness of the third material layer 153 is different from that of the first material layers 151. For example, the first material layers 151 may have the same physical thickness $t_{DBR1}$, and a physical thickness $t_{DBR3}$ of the third material layer 153 may be the same as the thickness $t_{DBR1}$ of the first material layers 151. Specifically, both the first material layers 151 and the third material layer 153 may have a physical thickness which is an odd-number multiple of $\lambda/(4*n_1)$. Here, $\lambda$ represents the wavelength of incident light and $n_1$ represents refractive index of the first material layer. For example, when an operation wavelength is 1.55 μm, the first material layer 151 may be formed of Si and have a thickness of 110.7 nm corresponding to $\lambda/(4n_{Si})$, and the third material layer 153 may be formed of $TiO_2$ and have a thickness of 110.7 nm which is the same as the first material layer 151. However, embodiments are not limited thereto, and the third material layer 153 may have a thickness different from that of the first material layer 151.

Similarly, the second material layers 152 may have the same physical thickness $t_{DBR2}$. Specifically, the second material layers 152 may have a thickness which is an odd-number multiple of $\lambda/(4*n_2)$. Here, $\lambda$ represents the wavelength of incident light and $n_2$ represents a refractive index of the second material layer 152. For example, the second material layer 152 may be formed of $SiO_2$ and have a thickness of 258.3 nm corresponding to $\lambda/(4\ n_{SiO2})$.

Furthermore, the first material layers 151 and the second material layers 152 may have the same optical thickness. In this case, only the third material layer 153 may have an optical thickness different from that of the first material layers 151. For example, when the operation wavelength is 1.55 μm, the first material layers 151 and the second material layers 152 may have an optical thickness of 397.5 nm corresponding to $\lambda/4$, and the third material layer 153 may have an optical thickness of 221.4 nm.

When incident light Li having a certain wavelength is incident on the second reflective structure 150, reflection may occur at an interface between the first material layers 151 and the second material layers 152 and an interface between the second material layers 152 and the third material layer 153.

In this case, when only the first material layers 151 and the second material layers 152 are alternately stacked, the differences in phase between all reflected light are the same, and thus a constructive interference may occur between the reflected light. When the second reflective structure 150 includes first material layers 151, the second material layers 152, and the third material layer 153, the differences in phase between all reflected light may not be the same, and thus a constructive interference may be prevented from occurring between some of the reflected light, thereby reducing reflectivity.

Figure 2:
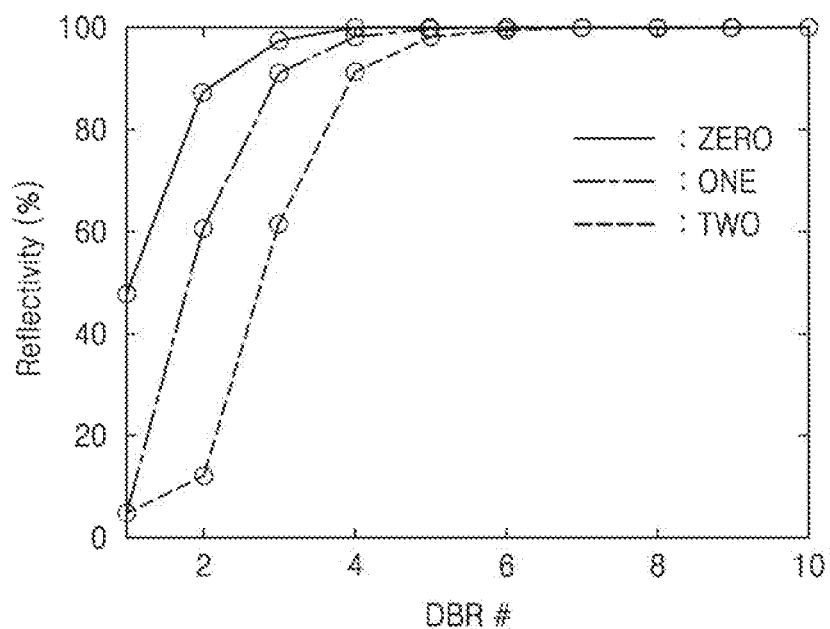
FIG. 2 is a graph showing the relationship between reflectivity of a reflective multilayer structure and the number of third material layers.
Figure 3:
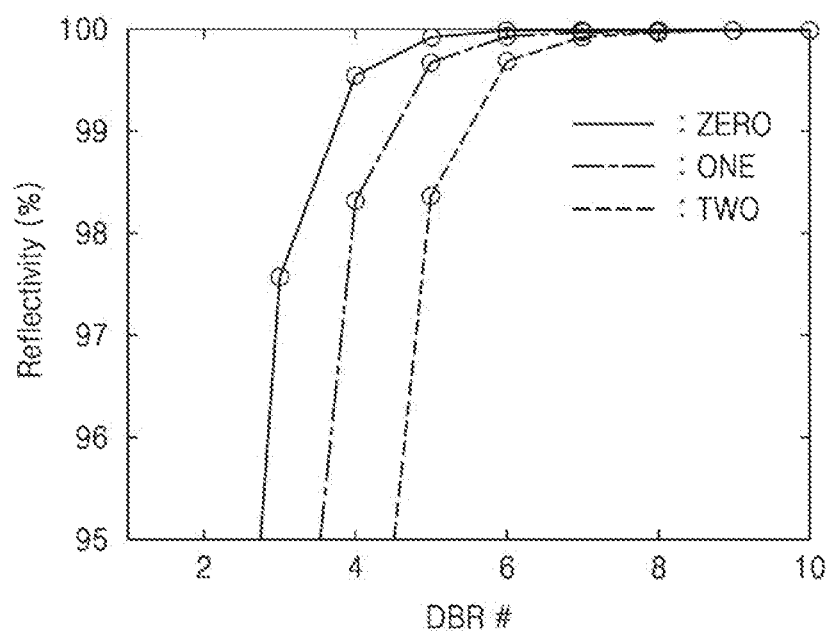
FIG. 3 is an enlarged graph showing a section of FIG. 2 with reflectivity of 95% to 100%.
Figure 4:
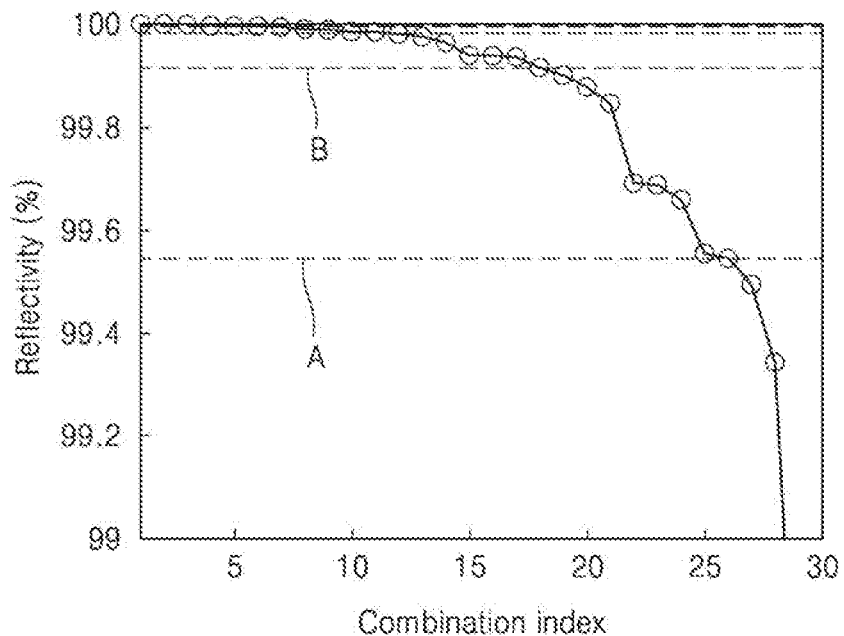
FIG. 4 illustrates a result of sorting, in descending order, various reflectivities obtained from various combinations of a first material layer, a second material layer, and a third material layer.

FIG. 2 is a graph showing the relationship between reflectivity of a reflective multilayer structure and the number of third material layers 153. FIG. 3 is an enlarged graph showing a section of FIG. 2 with reflectivity of 95% to 100%. FIG. 4 illustrates a result of sorting, in descending order, various reflectivities obtained from various combinations of a first material layer 151, a second material layer 152, and a third material layer 153.

The graphs of FIGS. 2 to 4 show results obtained when an operation wavelength was 1.55 μm, first material layers 151 were formed of Si having a thickness of 110.7 nm, second material layers 152 were formed of $SiO_2$ having a thickness of 258.3 nm, and third material layers 153 were formed of $TiO_2$ having a thickness of 110.7 nm.

In FIGS. 2 and 3, DBR # represents the number of unit multilayer structures. Here, the unit multilayer structures may be a pair of the first material layer 151 and the second material layer 152 or a pair of the third material layer 153 and the second material layer 152. Here, solid lines represent reflectivity when the number of third material layer 153 is zero, where the distributed Bragg reflector consisting of only the first material layers 151 and the second material layers 152.

Referring to FIGS. 2 and 3, when the number of unit multilayer structures is the same, reflectivity when the number of material layers 153 is one is lower than reflectivity when the number of third material layer 153 is zero. Furthermore, reflectivity when the number of third material layers 153 is two is lower than reflectivity when the number of third material layer 153 is one. Generally, reflectivity increases as the number of unit multilayer structures increases.

As described above, it may be understood that reflectivity decreases due to loss caused as the third material layer 153 interferes with constructive interference between the reflected light in the resonator.

In FIG. 4, horizontal dotted lines represent discrete and discontinuous reflectivity obtained when the third material layer 153 is not provided. For example, referring to both FIGS. 3 and 4, horizontal dotted line A represents reflectivity of about 99.55 when the number of unit multilayer structures each consisting of a pair of the first material layer 151 and the second material layer 152 is four, and horizontal dotted line B represents reflectivity of about 99.92 when the number of unit multilayer structures each consisting of a pair of the first material layer 151 and the second material layer 152 is five. A reflectivity between about 99.05 and about 99.92 cannot be achieved in the case of where a multilayer reflector does not include the third material layer 153.

In contrast, when a multilayer reflector is formed by various combinations of the first material layer 151, the second material layer 152, and the third material layer 153, there may be seven reflectivities between the horizontal dotted line A and the horizontal dotted line B. In other words, as the third material layer 153 is employed, the reflectivity of the second reflective structure 150 may be adjusted very precisely.

As described above, the reflectivity of the second reflective structure 150 should be lower than that the reflectivity of the first reflective structure 130, such that light resonating between first reflective structure 130 and the second reflective structure 150 may be output to the outside through the second reflective structure 150. In addition, in order to secure high resonance efficiency, the reflectivities of the first reflective structure 130 and the second reflective structure 150 should be as high as possible. The light modulator 100 according to the example embodiment may employ the third material layer 153 to adjust reflectivity very precisely, thereby outputting light while securing a relatively high resonance efficiency.

Figure 5:
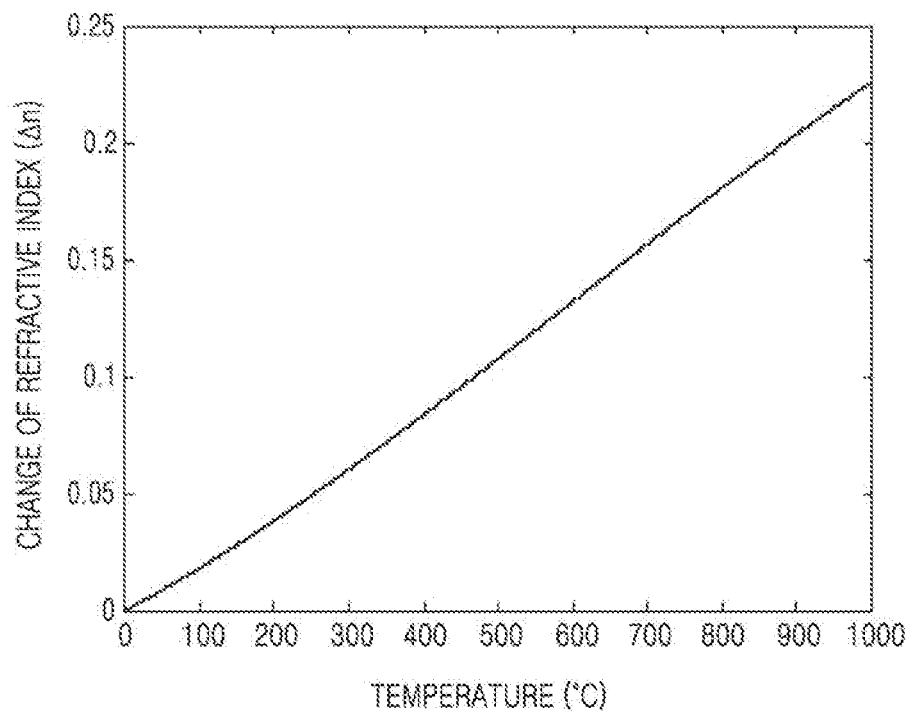
FIG. 5 illustrates a change in a refractive index of silicon (Si) with temperature.

Next, the principle of adjusting a reflection phase by an external signal of the light modulator 100 of the example embodiment will be described. FIG. 5 illustrates a change in a refractive index of silicon (Si) with temperature. The refractive index of Si may vary according to Equation 2 below.

$$\frac{dn}{dT} = 8.61 \times 10^{-5} + 3.63 \times 10^{-7}T - 2.07 \times 10^{-10}T^2 [K^{-1}] \qquad \text{[Equation 2]}$$

Here, T is a temperature and n is a refractive index. According to Equation 2 above, when a temperature changes by about 300 degrees, the refractive index of Si changes by about 0.1.

When the refractive index of Si changes, a reflection phase of the gratings 131 of the first reflective structure 130 changes, thus changing a resonance wavelength. As a result, an operation wavelength is out of the resonance wavelength. This is called detuned resonance. A reflection phase may be adjusted using detuned resonance.

In the example embodiment, the first reflective structure 130 is positioned adjacent to the substrate 110 and the second reflective structure 150 is positioned adjacent to the upper layer 160, but the positions of the first reflective structure 130 and the second reflective structure 150 may be switched.

Although a case in which the heating element 120 is positioned between the substrate 110 and the first reflective structure 130 is described according to an example embodiment, embodiments are not limited thereto. For example, the heating element 120 may be positioned above or below the second reflective structure 150 to change the reflection phase of the second reflective structure 150. In this case, the heating element 120 may be formed of a material transparent with respect to the incident light Li the output light $L_o$.

Figure 6:
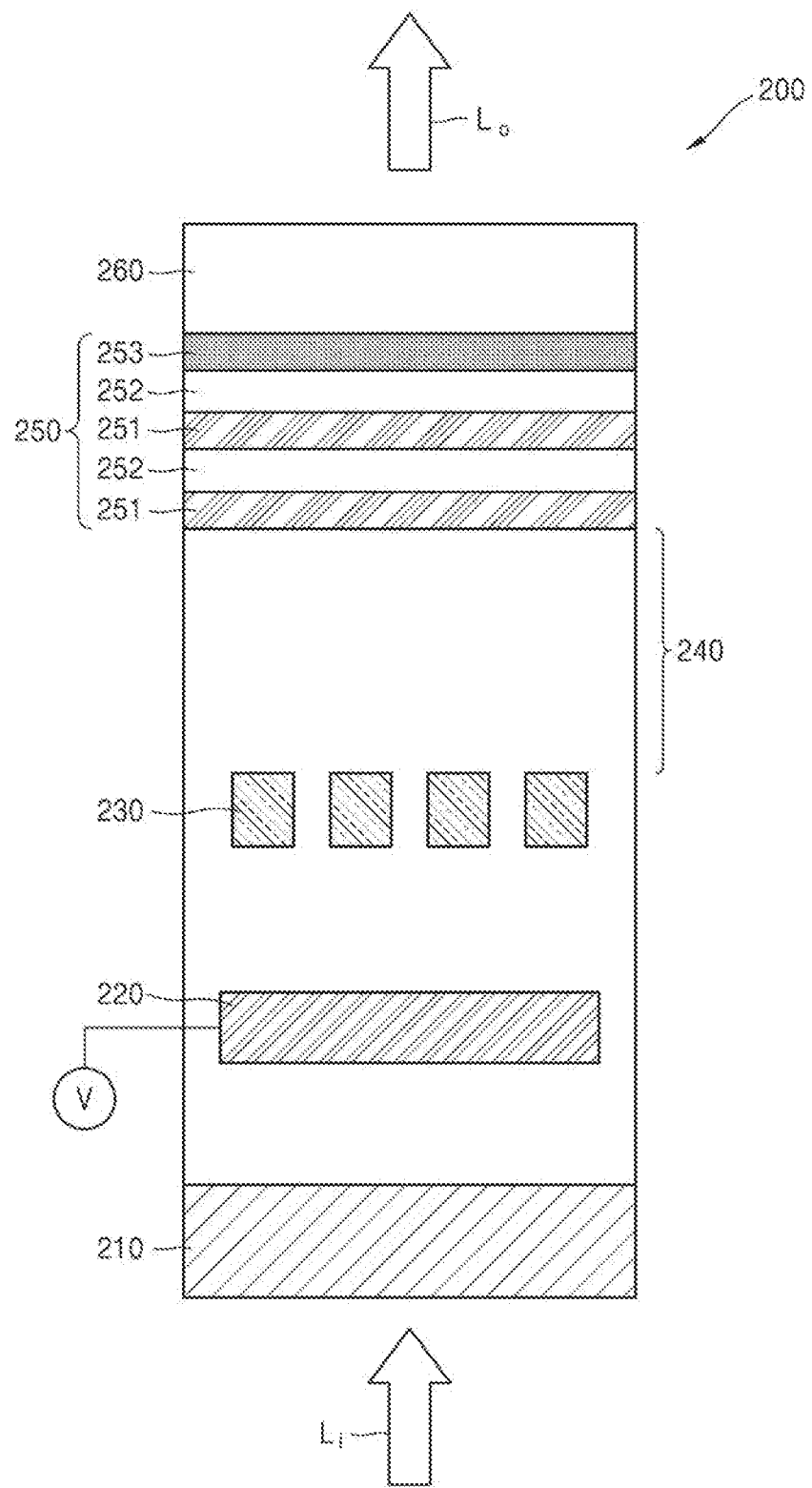
FIG. 6 is a side cross-sectional view illustrating a structure of a light modulator according to another example embodiment.

FIG. 6 is a side cross-sectional view illustrating a structure of a light modulator 200 according to another example embodiment. Referring to FIG. 6, the light modulator 200 according to the example embodiment is a transmissive device in which incident light $L_i$ is incident on a lower surface of the light modulator 200 and output light $L_o$ is output via an upper surface of the light modulator 200. The light modulator 200 includes a substrate 210 formed of a transparent material, a heating element 220 which is provided on the substrate 210 and transparent with respect to incident light Li, a first reflective structure 230 provided on the heating element 220, a cavity layer 240 provided on the first reflective structure 230, and a second reflective structure 250 provided on the cavity layer 240. An upper layer 260 formed of a transparent material may be provided on the second reflective structure 250. The second reflective structure 150 may be a multilayer reflector in which first material layers 251 and second material layers 252 having different refractive indices are repeatedly and alternately stacked, and at least one of locations at which the first material layers 251 are to be provided may be replaced with a third material layer 253. The positions of the first reflective structure 230 and the second reflective structure 250 may be switched.

The light modulator 200 of the example embodiment may be substantially the same as the light modulator 100 of the above-described example embodiment with reference to FIG. 1, except that the substrate 210 or the heating element 220 is formed of a transparent material with respect to the incident light Li.

A case in which the heating element 220 is positioned between the substrate 210 and the first reflective structure 230 is described as an example in the example embodiment, but the heating element 220 may be positioned on or below the second reflective structure 250.

Figure 7:
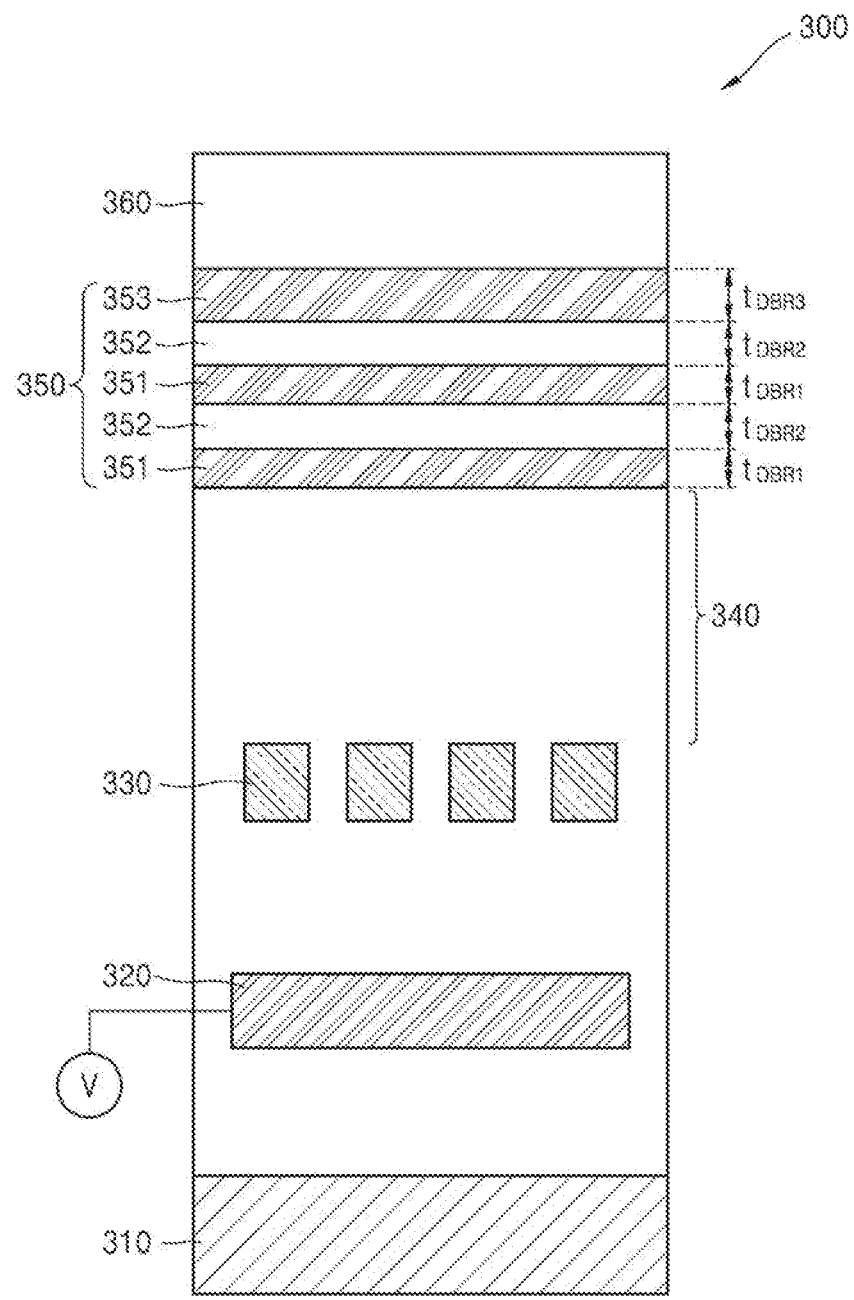
FIG. 7 is a side cross-sectional view illustrating a structure of a light modulator according to another example embodiment.

FIG. 7 is a side cross-sectional view illustrating a structure of a light modulator 300 according to another example embodiment. Referring to FIG. 7, the light modulator 300 according to the example embodiment includes a substrate 310, a heating element 320 provided on the substrate 310, a first reflective structure 330 provided on the heating element 320, a cavity layer 340 provided on the first reflective structure 330, and a second reflective structure 350 provided on the cavity layer 340. An upper layer 360 formed of a transparent material may be provided on the second reflective structure 350. The light modulator 300 may be a reflective type or transmissive type. The light modulator 300 of the example embodiment may be substantially the same as the light modulators 100 and 200 of the above-described embodiments with reference to FIGS. 1 and 6, except the structure of the second reflective structure 350.

The reflective structure 350 is a multilayer reflector in which first material layers 351 and 353 and second material layers 352 having different refractive indices are stacked repeatedly and alternately. A first material layer may include a thickness-changed first material layer 353 having a thickness $t_{DBR3}$ that is different from a thickness $t_{DBR1}$ of the other first material layers 351.

The thickness $t_{DBR1}$ of the other first material layers 351 is an odd-number multiple of $\lambda/(4*n_1)$, and the thickness $t_{DBR3}$ of the thickness-changed first material layer 353 may satisfy a condition in Equation 3 below.

$$t_{DBR1} - 0.75*\lambda/(4*n_1) \leq t_{DBR3} < t_{DBR1} \text{ or}$$
$$t_{DBR1} < t_{DBR3} \leq t_{DBR1} + \lambda/(4*n_1) \quad \text{[Equation 3]}$$

Here, $\lambda$ represents the wavelength of incident light and $n_1$ represents a refractive index of the first material layers.

For example, when the thickness $t_{DBR1}$ of the other first material layers 351 is $\lambda/(4*n_1)$, and the thickness $t_{DBR3}$ of the thickness-changed first material layer 353 satisfies a condition in Equation 4 below.

$$0.25*\lambda/(4*n_1) \leq t_{DBR3} < \lambda/(4*n_1) \text{ or } \lambda/(4*n_1) <$$
$$t_{DBR3} \leq 2*\lambda/(4*n_1) \quad \text{[Equation 4]}$$

Each of the second material layers 352 may have the same physical thickness. For example, the second material layers 352 may have a thickness which is an odd-number multiple of $\lambda/(4*n_2)$. Here, A is the wavelength of incident light and $n_2$ is a refractive index of the second material layer 352.

In addition, the other first material layers 351 and the second material layers 352 may have the same optical thickness. In this case, only the thickness-changed first material layer 353 may have an optical thickness different from that of the other first material layers 351 and the second material layers 352.

As in the example embodiment described above with reference to FIG. 1, constructive interference may be prevented from occurring between some of reflected light, and reflectivity may be reduced due to the thickness-changed first material layer 353. As the third material layer 353 is employed, the reflectivity of the second reflective structure 350 may be adjusted very precisely.

A case in which the heating element 320 is positioned between the substrate 310 and the first reflective structure 330 is described as an example in the example embodiment, but the heating element 320 may be positioned on or below the second reflective structure 350 to change a reflection phase of the second reflective structure 350.

Figure 8:
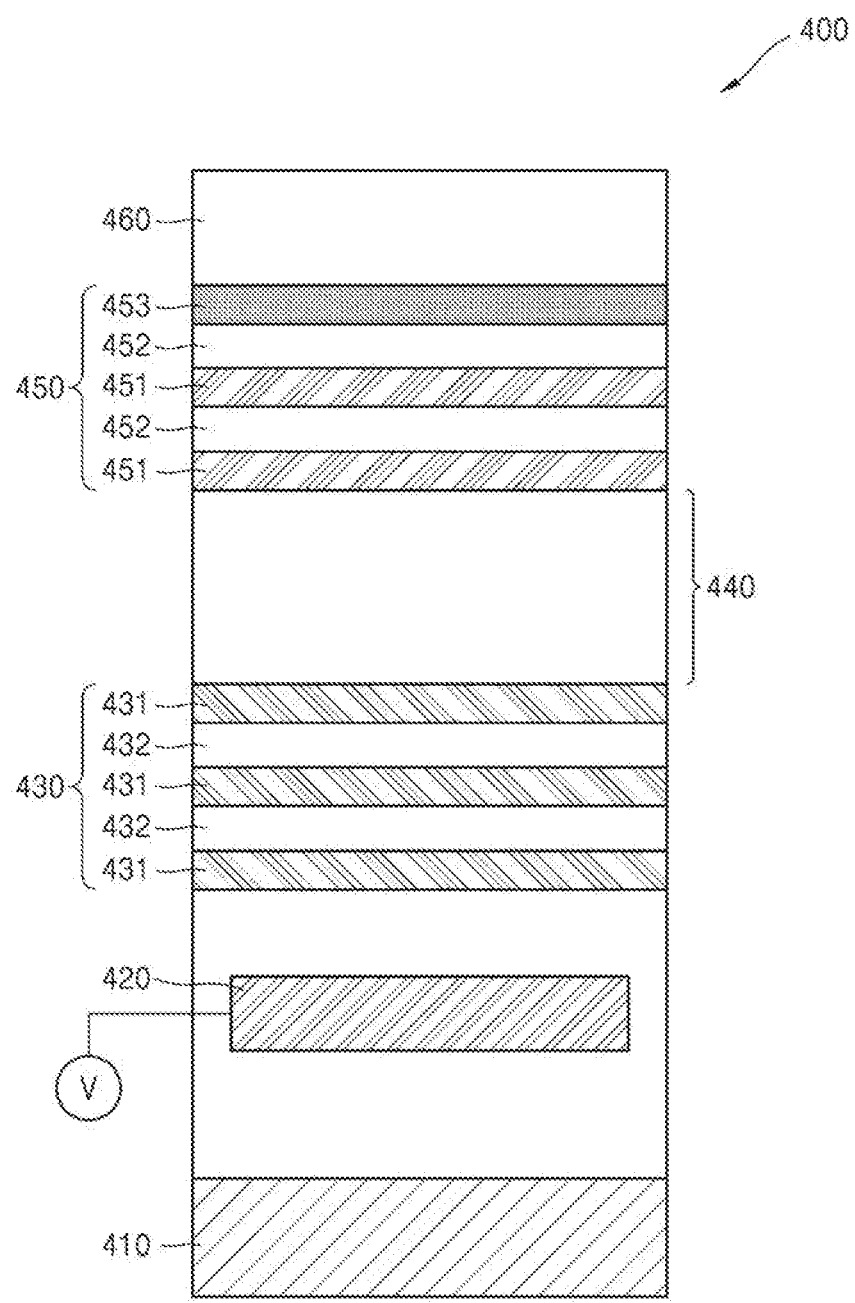
FIG. 8 is a side cross-sectional view illustrating a structure of a light modulator according to another example embodiment.

FIG. 8 is a side cross-sectional view illustrating a structure of a light modulator 400 according to another example embodiment. Referring to FIG. 8, the light modulator 400 according to the example embodiment includes a substrate 410, a heating element 420 provided on the substrate 410, a first reflective structure 430 provided on the heating element 420, a cavity layer 440 provided on the first reflective structure 430, and a second reflective structure 450 provided on the cavity layer 440. An upper layer 460 formed of a transparent material may be provided on the second reflective structure 450. The light modulator 400 may be of a reflective type or transmissive type. The light modulator 400 of the example embodiment is substantially the same as the light modulators 100 and 200 of the example embodiments described above with reference to FIGS. 1 and 6, except that the first reflective structure 430 is a distributed Bragg reflector.

The second reflective structure 450 may be a multilayer reflector in which first material layers 451 and second material layers 452 having different refractive indices are stacked repeatedly and alternately, and at least one of locations at which the first material layers 451 are to be provided may be replaced with a third material layer 453. The reflective structure 350 may be a multilayer reflector in which first material layers 451 and 453 and second material layers 452 having different refractive indices are stacked repeatedly and alternately. and The first material layers may include a thickness-changed first material layer 453 having a thickness that is different from a thickness of the other first material layers 451.

The first reflective structure 430 is a distributed Bragg reflector formed by repeatedly and alternately stacking fourth material layers 431 and fifth material layers 432 having different refractive indices. For example, the fourth material layers 431 may be formed of Si and the fifth material layers 432 may be formed of $SiO_2$. The fourth material layers 431 and the fifth material layer 432 may have the same optical thickness.

As in the example embodiment described above with reference to FIG. 1, when a temperature changes, the refractive index of Si changes, and thus the reflection phase of the first reflective structure 430 changes, thus changing a resonance wavelength. As a result, an operation wavelength is out of the resonant wavelength, thereby adjusting the reflection phase.

According to the example embodiment, the first reflective structure 430 may be a distributed Bragg reflector, but embodiments are not limited thereto. Similar to the second reflective structure 450, the first reflective structure 430 may be configured by repeatedly and alternately stacking the fourth material layers 431 and the fifth material layers 432 having different refractive indices such that at least one of locations at which the fourth material layers 431 are to be provided is replaced with a sixth material layer having a refractive index different from that of the fourth material layers 431 or has a thickness different from that of the other first material layers 431.

A case in which the heating element 420 is positioned between the substrate 410 and the first reflective structure 430 is described as an example in the example embodiment, but the heating element 420 may be positioned on or below the second reflective structure 450 to change a reflection phase of the second reflective structure 450.

Figure 9:
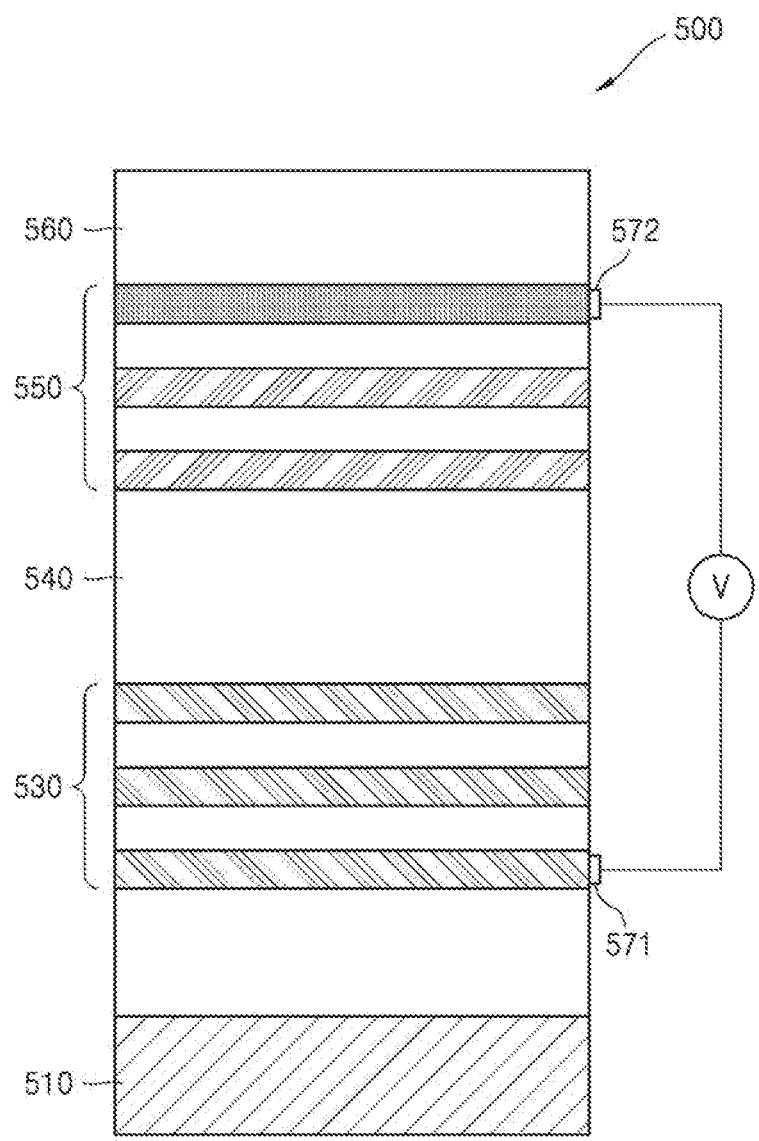
FIG. 9 is a side cross-sectional view illustrating a structure of a light modulator according to another example embodiment.

FIG. 9 is a side cross-sectional view illustrating a structure of a light modulator 500 according to another example embodiment.

Referring to FIG. 9, the light modulator 500 according to the example embodiment includes a substrate 510, a first reflective structure 530 provided on the substrate 510, a cavity layer 540 provided on the first reflective structure 530, and a second reflective structure 550 provided on the cavity layer 540. An upper layer 560 formed of a transparent material may be provided on the second reflective structure 550. The light modulator 500 may be of a reflective type or transmissive type. The light modulator 500 of the example embodiment is substantially the same as the light modulators 100, 200, 300, and 400 of the above-described embodiments with reference to FIGS. 1, 6, 7, and 8, except that an electrical signal is used as a stimulus instead of heat.

The cavity layer 540 may be an active layer, the physical properties of which change according to electrical conditions thereof. The permittivity or refractive index of the cavity layer 540 may vary according to the electrical conditions associated with the cavity layer 540 and surrounding regions thereof. A change in the permittivity/refractive index of the cavity layer 540 may be due to a change of a charge concentration of one or more inner regions of the cavity layer 540. The permittivity/refractive index of the cavity layer 540 may change due to a change in the charge concentration of the one or more inner regions of the cavity layer 540. The permittivity/refractive index of the cavity layer 540 may vary according to an electric field or voltage applied to the cavity layer 540. The cavity layer 540 may include, for example, a transparent conductive oxide (TCO), such as indium tin oxide (ITO), indium zinc oxide (IZO), aluminum zinc oxide (AZO), gallium zinc oxide (GZO), aluminum gallium zinc oxide (AGZO), and gallium indium zinc oxide (GIZO). Alternatively, the cavity layer 540 may include a transition metal nitride (TMN) such as titanium nitride (TiN), zirconium nitride (ZrN), hafnium nitride (HfN), or tantalum nitride (TaN). In addition, the cavity layer 540 may include an electro-optic (EO) material, the effective permittivity of which changes when an electrical signal is applied thereto. The EO material may include, for example, a crystalline material, such as lithium niobium trioxide ($LiNbO_3$), lithium tantalite ($LiTaO_3$), potassium tantalate niobate (KTN), or lead zirconate titanate (PZT), or various polymers having electro-optic properties. The cavity layer 540 may be a conductor or a semiconductor.

The light modulator 500 may further include a first electrode 571 in contact with the first reflective structure 530 and a second electrode 572 in contact with the second reflective structure 550. When the first reflective structure 530 and the second reflective structure 550 have conductivity, the first electrode 571 and the second electrode 572 may be electrode pads in contact with the first reflective structure 530 and the second reflective structure 550. When the first reflective structure 530 and the second reflective structure 550 do not have conductivity, the first electrode 571 and the second electrode 572 may include transparent electrode layers on upper or lower portions of the first reflective structure 530 and the second reflective structure 550.

When a certain voltage is applied between the first electrode 571 and the second electrode 572 from an external power source, the refractive index of the cavity layer 540 may change. Accordingly, the phase of light resonating between the first reflective structure 530 and the second reflective structure 550 changes. Accordingly, the phase of the incident light $L_i$ and the phase of the output light $L_o$ may be different from each other.

Furthermore, when a certain voltage is applied between the first electrode 571 and the second electrode 572 from an external power source, a part of the resonating light is absorbed in the cavity layer 540 due to electroabsorption. Accordingly, the intensities of the incident light $L_i$ and the output light $L_o$ may be different from each other.

A case in which the cavity layer 540 is an active layer, the physical properties of which change according to electrical conditions is described as an example embodiment, but embodiments are not limited thereto. For example, at least one of the layers of the first reflective structure 530 or the second reflective structure 550 may be an active layer, the physical properties of which change according to electrical conditions. For example, at least one layer of the first reflective structure 530 may be an EO material layer including an EO material, the effective permittivity of which changes when an electrical signal is supplied thereto. Accordingly, when power is supplied from an external power source, the refractive index of the EO material layer of the first reflective structure 530 changes and the phase of light resonating between the first reflective structure 530 and the second reflective structure 550 changes.

Heat and voltage have been described above as examples of an external stimulus in the above-described example embodiments, but embodiments are not limited thereto. The external stimulus may be current or a magnetic field, and at least one of the cavity layer 540, the first reflective structure 530 or the second reflective structure 550 of the resonator may be formed of a material, the refractive index of which is changed by current or a magnetic field.

Figure 10:
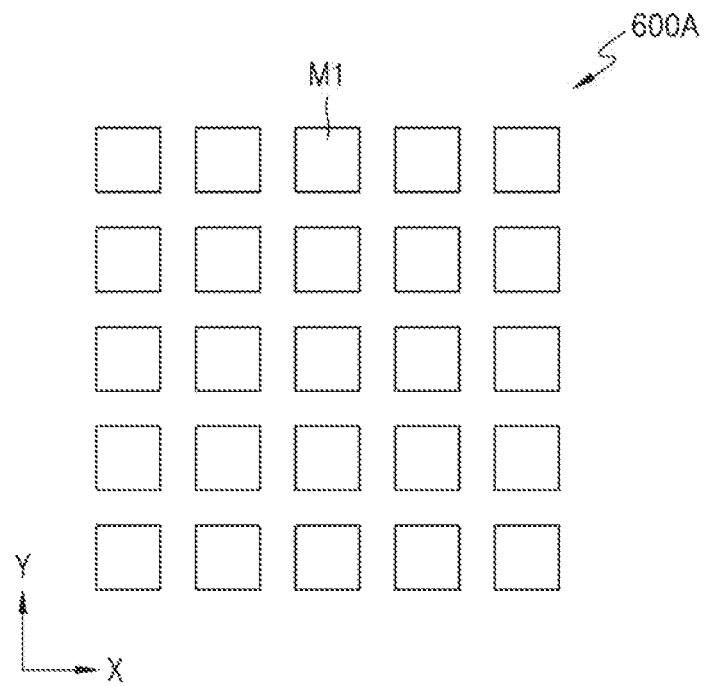
FIG. 10 is a plan view illustrating a structure of an optical device according to an example embodiment.

FIG. 10 is a plan view illustrating a structure of an optical device according to an example embodiment. Referring to FIG. 10, a spatial light modulator 600A with a plurality of light modulators M1 may be provided. The spatial light modulator 600A is an example embodiment of an optical device. The plurality of light modulators M1 may be arranged in a plurality of rows and columns in an X-axis direction and a Y-axis direction. Each of the light modulators M1 may be understood as a pixel or a channel, and may have various shapes such as a tetragonal shape, a circular shape, a polygonal shape, etc. The reflection phases or transmission phases of the light modulators M1 may be independently adjusted, and thus, the spatial light modulator 600A may have different phase distributions in units of pixels or channels.

Figure 11:
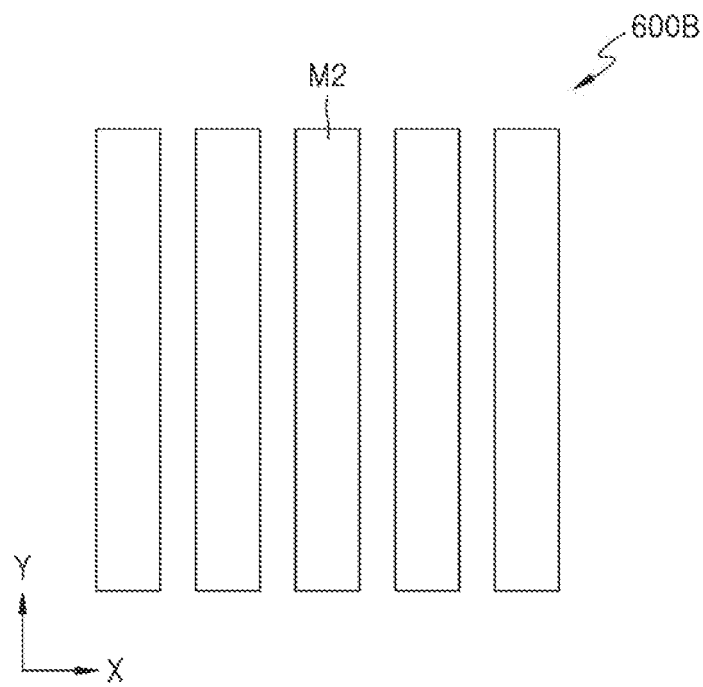
FIG. 11 is a plan view illustrating a structure of an optical device according to another example embodiment.

FIG. 11 is a plan view illustrating a structure of an optical device according to another example embodiment. Referring to FIG. 11, a spatial light modulator 600B including a plurality of light modulators M2 may be provided. The spatial light modulator 600B is an example of an optical device. The plurality of light modulators M2 may have a line shape when viewed from the top. For example, the plurality of light modulators M2 may extend in the Y-axis direction and arranged spaced apart from each other in the X-axis direction.

The arrangements of the optical devices shown in FIG. 10 or 11 are examples, but embodiments are not limited thereto. In addition, three or more unit regions may be arranged in various ways.

Figure 12:
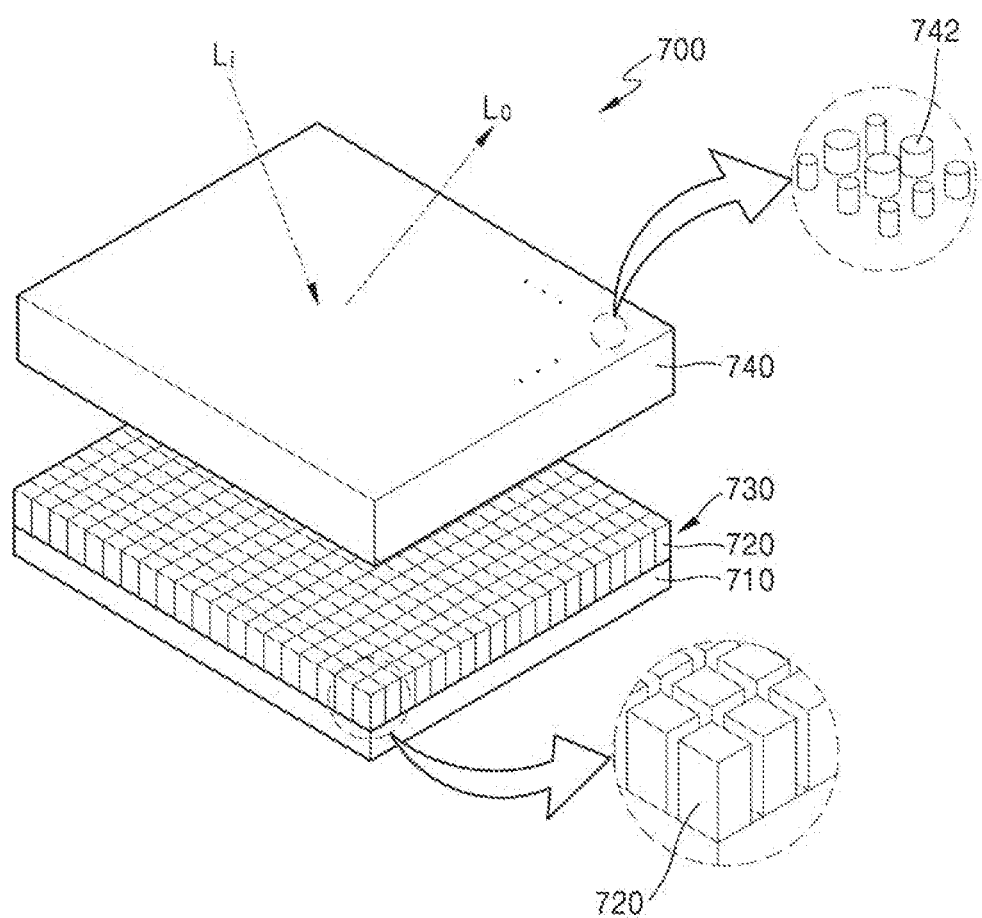
FIG. 12 is a plan view illustrating a structure of an optical device according to another example embodiment.

FIG. 12 is a plan view illustrating a structure of an optical device according to another example embodiment.

Referring to FIG. 12, a beam scanning device 700 may include a spatial light modulator 730 configured to modulate the phase of light, and a phase mask 740 configured to emit light from the spatial light modulator 730. The beam scanning device 700 is an example of an optical device.

The spatial light modulator 730 may include light modulators 720 arranged in units of pixels on a substrate 710. The spatial light modulator 730 may modulate the phase of light for each of the light modulators 720 corresponding to each pixel. Each of the light modulators 720 may be a unit capable of independently driving the spatial light modulator 730. Each of the light modulators 720 may be a unit capable of modulating a phase. The light modulators 720 may be disposed on the substrate 710 to be spaced apart from each other in units of pixels. A certain phase may be controlled according to input value, such as voltage, current, heat, or a magnetic field, which is input to the spatial light modulator 730. The phase of light emitted to the outside may be adjusted by changing resonance characteristics by an external signal supplied to the spatial light modulator 730.

The phase mask 740 may include a support plate 741 and a plurality of nanostructures 742 arranged on the support plate 741. The support plate 741 may be a transparent plate that transmits light.

The nanostructures 742 may include nanosized structures. A nanostructure may include, for example, a columnar structure. The phase mask 740 may include a nanostructure array in a region corresponding to the pixels of the spatial light modulator 730. For example, the phase mask 740 may have a different nanostructure arrangement for each pixel. At least one of the size, number, shape, or arrangement intervals of the nanostructures 742 may be differently set according to pixels. The nanostructures 742 may be arranged periodically or aperiodically. The phase of transmitted waves may be adjusted by arranging the nanostructures 742 by using a combination of the shape, arrangement intervals, and size of the nanostructures 742.

Accordingly, the beam scanning device 700 may be configured by combining the spatial light modulator 730 and the phase mask 740. The beam scanning device 700 may operate as a reflection type or a transmission type according to the combination of the spatial light modulator 730 and the phase mask 740. In the beam scanning device 700 which is of a reflective type, light may be incident toward the phase mask 740 and the light incident on the spatial light modulator 730 through the phase mask 740 may resonate in the spatial light modulator 730 and be emitted via the phase mask 740. In the beam scanning device 700 which is of a transmission type, light may be incident toward the spatial light modulator 730, resonate in the spatial light modulator 730, and be emitted via the phase mask 740.

An optical wavefront of emission light $L_o$ emitted from the beam scanning device 700 has a phase distribution according to the combination of the spatial light modulator 730 and the phase mask 740, and thus a traveling direction of the emission light $L_o$ may be controlled according to the phase distribution.

The beam scanning device of the above-described example embodiment may be employed in a system, for example, a three-dimensional (3D) sensor such as a vehicle LiDAR sensor or a depth sensor used in a 3D camera, to increase the accuracy of the system. The beam scanning device of the above-described example embodiment may be used for not only LiDAR for a vehicle but also LiDAR for a robot, LiDAR for a drone, a security system for intruder detection, a subway screen door obstacle detection system, a depth sensor, a user face recognition sensor for a mobile phone, augmented reality (AR), motion recognition and object profiling in a TV or entertainment equipment, and the like.

Figure 13:
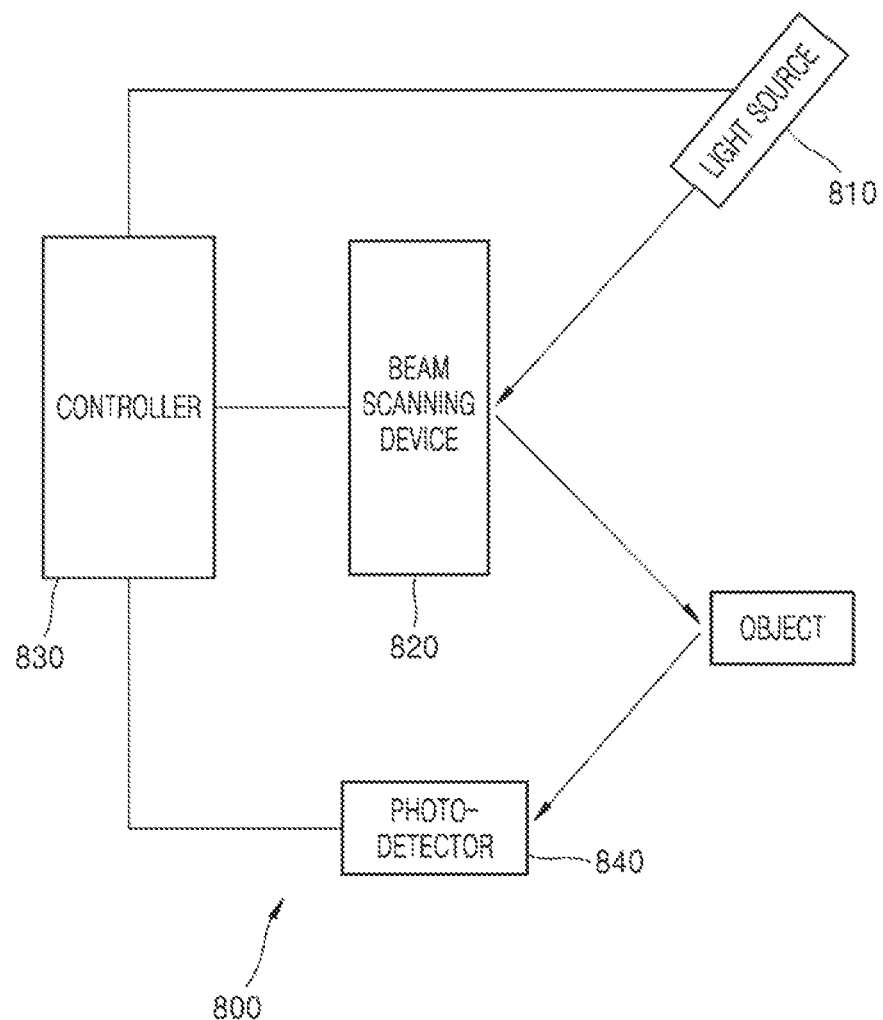
FIG. 13 is a block diagram illustrating a structure of an electronic apparatus including an optical device according to an example embodiment.

For example, FIG. 13 is a block diagram illustrating a structure of an electronic apparatus 800 including an optical device according to example an embodiment.

Referring to FIG. 13, an electronic apparatus 800 according to an embodiment may include a light source 810 emitting light, a beam scanning device 820 configured to adjust a traveling direction of light incident from the light source 810, a photodetector 840 configured to sense light emitted from the beam scanning device 820 and reflected from an object, and a controller 830 configured to control the beam scanning device 820.

The light source 810 may include, for example, a light source that emits visible light or a laser diode (LD) or a light-emitting diode (LED) that emits near-infrared ray of a wavelength band of about 800 nm to about 1500 nm.

The beam scanning device 820 may include the example embodiments described above with reference to FIGS. 10 to 12. The beam scanning device 820 may adjust a traveling direction of an optical beam by modulating a phase of the optical beam according to at least one input of voltage, current, heat, temperature, or a magnetic field for each pixel. The beam scanning device 820 is capable of performing scanning with a wide viewing angle through a spatial light modulator and a phase mask. Although FIG. 13 illustrates an example in which the light source 810 is provided separately from the beam scanning device 820, the light source 810 may be provided in the beam scanning device 820.

The controller 830 may control operations of the beam scanning device 820, the light source 810, and the photodetector 840. For example, the controller 830 may control on/off operations of the light source 810 and the photodetector 840 and a beam scanning operation of the beam scanning device 820. In addition, the controller 830 may calculate information about an object, based on a measurement result of the photodetector 840.

The electronic apparatus 800 may periodically emit light with respect to a plurality of surrounding regions by using the beam scanning device 820 to obtain information about objects at a plurality of locations in the vicinity.

Figure 14:
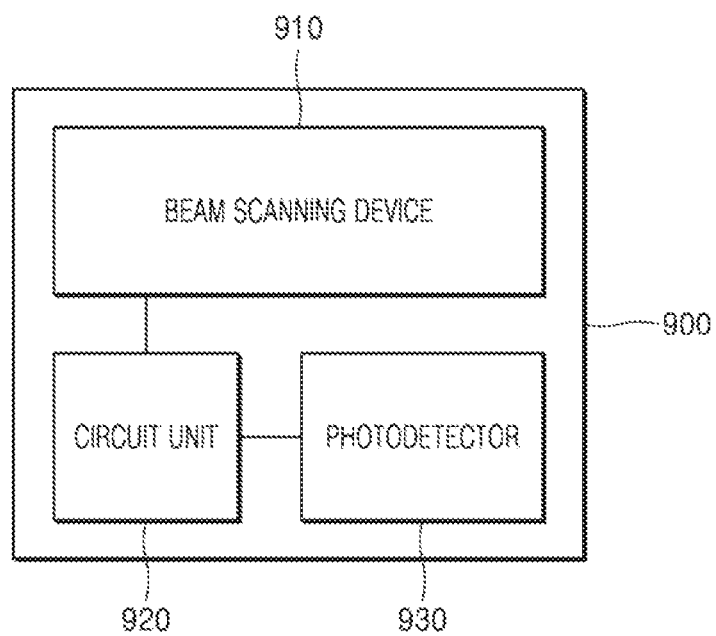
FIG. 14 is a diagram illustrating an electronic apparatus including an optical device according to an example embodiment.

FIG. 14 is a diagram schematically illustrating an electronic apparatus 900 including an optical device according to an embodiment.

As illustrated in FIG. 14, the electronic apparatus 900 may include a beam scanning device 910 and a photodetector 930 for detecting light steered by the beam scanning device 910 and reflected from an object. The electronic apparatus 900 may further include a circuit unit 920 connected to at least one of the beam scanning device 910 or the photodetector 930. The circuit unit 920 may include an operation unit for obtaining and calculating data and further include a driver, a controller, and the like. The circuit unit 920 may further include a power supply and a memory.

Although FIG. 14, illustrates a case in which the electronic apparatus 900 includes the beam scanning device 910 and the photodetector 930, the beam scanning device 910 and the photodetector 930 may be provided separately in different apparatuses. The circuit unit 920 may be connected to the beam scanning device 910 or the photodetector 930 not by wire but by wireless communication. In addition, the configuration of FIG. 14 may be variously changed.

The beam scanning device according to the example embodiment described above is applicable to various types of systems. For example, the beam scanning device is applicable to a LiDAR device. The LiDAR device may be a phase-shifted device or a time-of-flight (TOF) device. The LiDAR device is applicable to self-driving vehicles, flying objects such as drones, mobile devices, small-sized walking devices, for example, bicycles, motorcycles, strollers, boards, etc., robots, human/animal assistance devices, for example, canes, helmets, accessories, clothing, watches, bags, etc., Internet-of-Things (IoT) devices/systems, security devices/systems, and the like.

Figure 15:
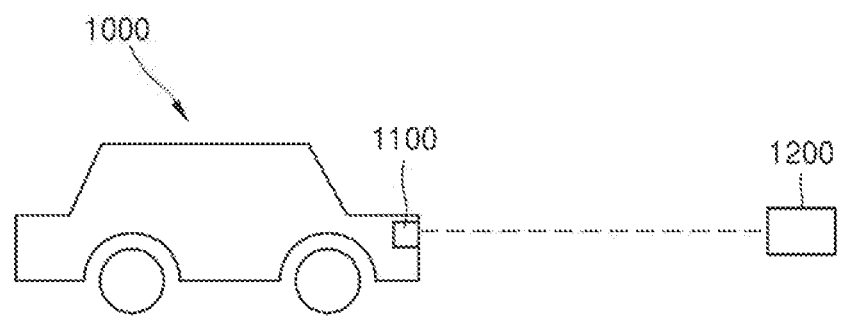
FIG. 15 is a side view illustrating an example in which an electronic apparatus according to an example embodiment is applied to light detection and ranging (LiDAR) for a vehicle.
Figure 16:
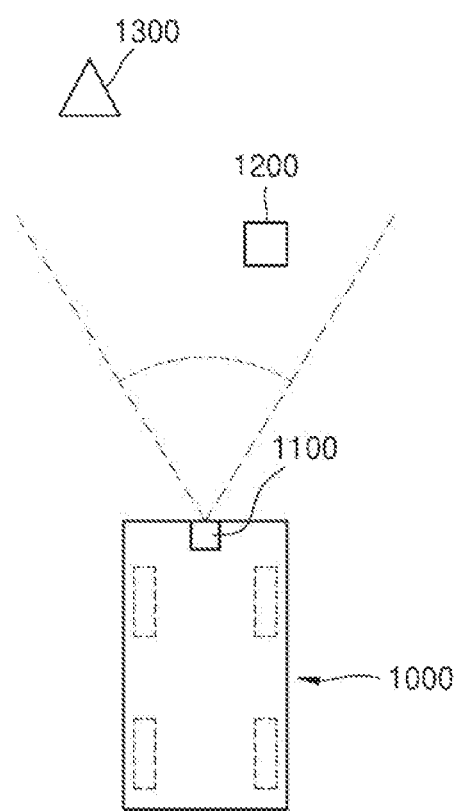
FIG. 16 is a side view illustrating an example in which a beam scanning device according to an example embodiment is applied to LiDAR for a vehicle.

FIG. 15 is a side view illustrating an example in which an electronic apparatus according to an example embodiment is applied to LiDAR for a vehicle. FIG. 16 is a plan view illustrating an example in which a beam scanning device according to an example embodiment is applied to LiDAR for a vehicle.

FIGS. 15 and 16 are conceptual diagrams illustrating cases in which a LiDAR device, including a beam scanning device, according to an example embodiment is applied to a vehicle. FIG. 15 is a side view and FIG. 16 is a top view.

Referring to FIG. 15, a LiDAR device 1100 is applicable to a vehicle 1000 and information about a subject 1200 may be obtained using the LiDAR device 1100. The vehicle 1000 may be a vehicle having a self-driving function. The LiDAR device 1100 may be used to detect the subject 1200 that is, for example, an object or a human, in a traveling direction of the vehicle 1000. In addition, a distance to the subject 1200 may be measured using information such as a time difference between a transmitted signal and a detected signal. In addition, as illustrated in FIG. 16, information about the subject 1200 in a near distance within a scan range and a subject 1300 in a far distance may be obtained.

Beam scanning devices according to various example embodiments are applicable to various types of systems, as well as LiDAR devices. For example, 3D information about spaces and subjects may be obtained by scanning through beam scanning devices according to various example embodiments, and thus the beam scanning devices are applicable to 3D image obtaining apparatuses, 3D cameras, etc. The beam scanning devices are applicable to holographic display devices and structured light generating devices. The beam scanning devices are applicable to various types of optical devices such as a hologram generating devices, light coupling devices, variable focus lenses, depth sensors, and the like. The beam scanning devices are applicable to various fields using a metasurface or a metastructure. In addition, a beam scanning device and a system including the same according to example embodiments are applicable to various optical and electronic fields for various purposes.

A light modulator, an optical device including the light modulator, and an electronic apparatus including the optical device according example embodiments as described above are only examples and it will be apparent to those of ordinary skill in the art that various modifications may be made and other equivalent embodiments may be derived. Therefore, the scope of the present disclosure should be defined by the appended claims.

In a light modulator, an optical device including the light modulator, and an electronic apparatus including the optical device according to the example embodiments set forth herein, a reflective multilayer structure may have precisely adjusted reflectivity or transmittance.

In a light modulator, an optical device including the light modulator, and an electronic apparatus including the optical device according to the example embodiments set forth herein, pixels may be reduced in size.

In a light modulator, an optical device including the light modulator, and an electronic apparatus including the optical device according to the example embodiments set forth herein, a reflective multilayer structure may be reduced in thickness.

In a light modulator, an optical device including the light modulator, and an electronic apparatus including the optical device according to the example embodiments set forth herein, a distribution of reflection phases or transmission phases may be precisely controlled.

It should be understood that example embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A light modulator comprising:
a substrate; and
a resonator configured to modulate a phase of incident light by modulating a refractive index based on an external stimulus, the resonator comprising a first reflective structure provided on the substrate, a cavity layer provided on the first reflective structure, and a second reflective structure provided on the cavity layer,
wherein at least one of the first reflective structure or the second reflective structure comprises first material layers, second material layers that are alternately stacked with the first material layers, and a third material layer,
wherein each of the first material layers has a first refractive index, each of the second material layers has a second refractive index that is different from the first refractive index, and the third material layer has a third refractive index that is different from the first refractive index,
wherein each of the first material layers has a first optical thickness, and the third material layer has a third optical thickness that is different from the first optical thickness, and
wherein each of the first material layers has a first physical thickness, and the third material layer has a third physical thickness that is equal to the first physical thickness.

2. The light modulator of claim 1, wherein the first physical thicknesses of the first material layers and the third physical thickness of the third material layer are odd-number multiples of $\lambda/(4*n_1)$,
where $\lambda$ is a wavelength of the incident light and $n_1$ is the first refractive index of the first material layers.

3. The light modulator of claim 1, wherein each of the second material layers has a second physical thickness that is an odd-number multiple of $\lambda/(4*n_2)$,
where $\lambda$ is a wavelength of the incident light and $n_2$ is the second refractive index of the second material layers.

4. The light modulator of claim 1, wherein the first reflective structure has a first reflectivity and the second reflective structure has a second reflectivity that is less than the first reflectivity.

5. The light modulator of claim 1, wherein at least one of the first reflective structure and the second reflective structure comprises a distributed Bragg reflector or a grating reflector.

6. The light modulator of claim 1, further comprising a heating element provided between the substrate and the second reflective structure, provided between the first reflective structure and the second reflective structure, or provided above the second reflective structure,
wherein the first reflective structure or the second reflective structure comprises a material having a refractive index that changes based on temperature.

7. The light modulator of claim 1, wherein the cavity layer, the first reflective structure, or the second reflective structure comprises an electro-optic material having a permittivity that changes based on an electrical signal applied thereto, and
wherein the light modulator further comprises a first electrode in contact with the first reflective structure, and a second electrode in contact with the second reflective structure.

8. The light modulator of claim 1, wherein the external stimulus comprises at least one of heat, a voltage, a current, or a magnetic field.

9. An optical device comprising:
a spatial light modulator comprising a plurality of light modulators, each of the plurality of light modulators comprising:
a substrate; and
a resonator configured to modulate a phase of incident light by modulating a refractive index based on an external stimulus, the resonator comprising a first reflective structure provided on the substrate, a cavity layer provided on the first reflective structure, and a second reflective structure provided on the cavity layer,
wherein at least one of the first reflective structure or the second reflective structure comprises first material layers, second material layers that are alternately stacked with the first material layers, and a third material layer,
wherein each of the first material layers has a first refractive index, each of the second material layers has a second refractive index that is different from the first refractive index, and the third material layer has a third refractive index that is different from the first refractive index,
wherein each of the first material layers has a first optical thickness, and the third material layer has a third optical thickness that is different from the first optical thickness, and
wherein each of the first material layers has a first physical thickness, and the third material layer has a third physical thickness that is equal to the first physical thickness,
wherein each of the plurality of light modulators are provided corresponding to one-dimensional pixels or two-dimensional pixels, the spatial light modulator being configured to modulate a phase of light for each of the pixels.

10. The optical device of claim 9, further comprising a phase mask comprising a transparent support plate and a plurality of nanostructures provided on the transparent support plate,
wherein each of the plurality of nanostructures are arranged differently for each of the corresponding pixels to control a phase of light.

11. An electronic apparatus comprising:
a light source;
an optical device configured to adjust a traveling direction of light emitted from the light source and transmit the light to travel toward a subject, the optical device comprising:
a spatial light modulator comprising a plurality of light modulators, each of the plurality of light modulators comprising:
a substrate; and
a resonator configured to modulate a phase of incident light by modulating a refractive index based on an external stimulus, the resonator comprising a first reflective structure provided on the substrate, a cavity layer provided on the first reflective structure, and a second reflective structure provided on the cavity layer,
wherein at least one of the first reflective structure or the second reflective structure comprises first material layers, second material layers that are alternately stacked with the first material layers, and a third material layer,
wherein each of the first material layers has a first refractive index, each of the second material layers has a second refractive index that is different from the first refractive index, and the third material layer has a third refractive index that is different from the first refractive index, wherein each of the first material layers has a first optical thickness, and the third material layer has a third optical thickness that is different from the first optical thickness, and wherein each of the first material layers has a first physical thickness, and the third material layer has a third physical thickness that is equal to the first physical thickness, and a phase mask comprising a transparent support plate and a plurality of nanostructures provided on the transparent support plate, wherein each of the plurality of light modulators are provided corresponding to one-dimensional pixels or two-dimensional pixels, the spatial light modulator being configured to modulate a phase of light for each of the pixels, and wherein each of the plurality of nanostructures are provided differently for each of the corresponding pixels to control the phase of light;

a receiver configured to receive the light reflected from the subject and convert the light into an electrical signal; and a processor configured to process the electrical signal obtained by the receiver.

12. The electronic apparatus of claim 11, wherein the electronic apparatus comprises at least one of a light detection and ranging (LiDAR) apparatus, a three-dimensional (3D) image obtaining apparatus, a 3D sensor, a depth sensor, or a holographic display apparatus.

* * * * *